United States Patent [19]

Silverwater

[11] Patent Number: 4,524,793

[45] Date of Patent: Jun. 25, 1985

[54] AUTOMATIC RESERVOIR BLEED VALVE

[75] Inventor: Bernard Silverwater, Plainview, N.Y.

[73] Assignee: Pall Corporation, Glen Cove, N.Y.

[21] Appl. No.: 541,985

[22] Filed: Oct. 14, 1983

[51] Int. Cl.³ .............................................. F16K 24/00
[52] U.S. Cl. ..................................... 137/198; 137/183; 137/199
[58] Field of Search ........................ 137/183, 198, 199; 138/42

[56] References Cited

U.S. PATENT DOCUMENTS

| | | | |
|---|---|---|---|
| 1,873,396 | 8/1932 | Hallenbeck | 137/199 X |
| 1,947,586 | 2/1934 | Fletcher | 138/42 |
| 2,544,476 | 3/1951 | Venning | 137/199 X |
| 2,595,222 | 5/1952 | Bayuk | 137/183 |
| 2,664,109 | 12/1953 | Iager | 138/42 |
| 2,729,228 | 1/1956 | stevenson | 137/199 |
| 4,383,543 | 5/1983 | Rawlins | . |

Primary Examiner—Robert G. Nilson

Attorney, Agent, or Firm—Leydig, Voit, Osann, Mayer & Holt, Ltd.

[57] ABSTRACT

An automatic valve for bleeding air from liquid or with reversal of the principal elements, vice-versa. In an embodiment for bleeding free air from a hydraulic fluid reservoir or the like, a capillary extends through a movable piston in series with an orifice to differentiate between hydraulic fluid and air due to differences in the pressure drop across the capillary which results from differences in the viscosity of the fluids attempting to pass therethrough. When air, having relatively low viscosity, flows through the capillary, the differential pressure across the capillary and, accordingly, across the piston, is low and the valve remains open to bleed the air. When hydraulic fluid attempts to pass through the capillary, however, the differential pressure thereacross due to the fluid's relatively high viscosity is sufficient to move the piston and close the valve. In the preferred embodiment, the bleed valve may also utilize a second movable piston to positively seal the valve at low reservoir pressure, thus preventing the valve from leaking fluid when the hydraulic system is inactive.

13 Claims, 7 Drawing Figures

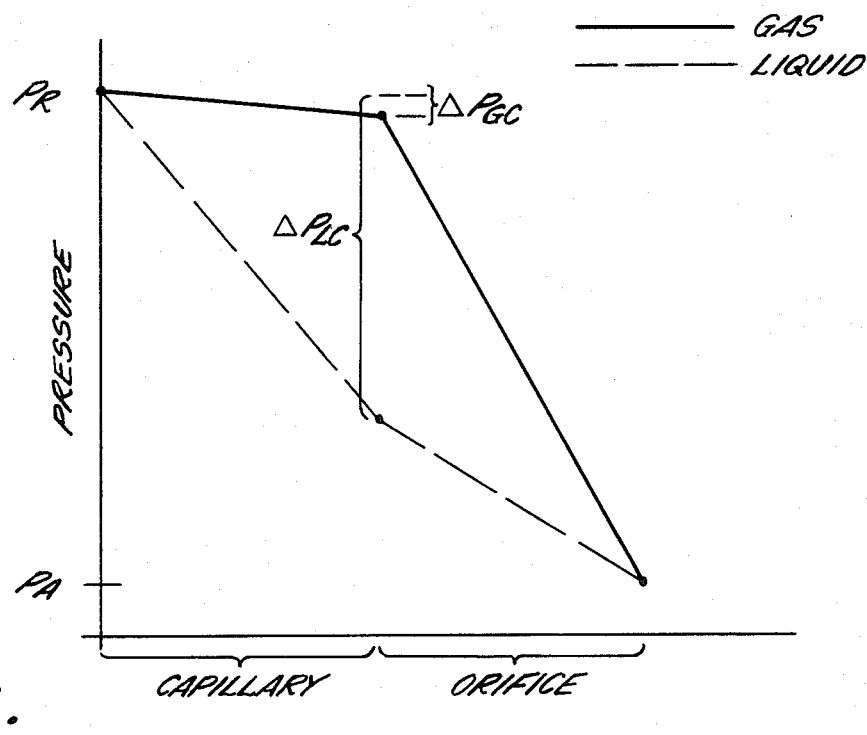
_Fig. 1._
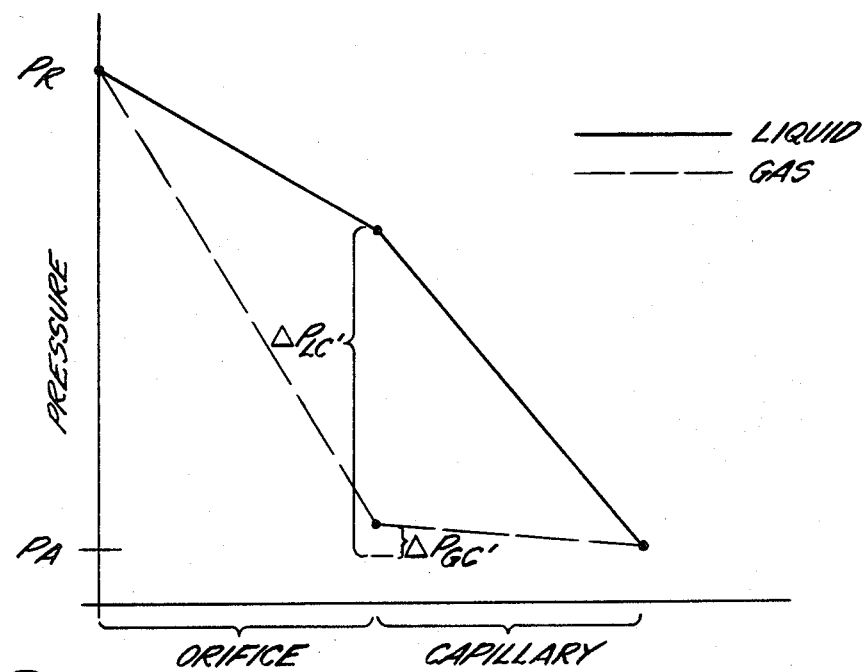
_Fig. 2._

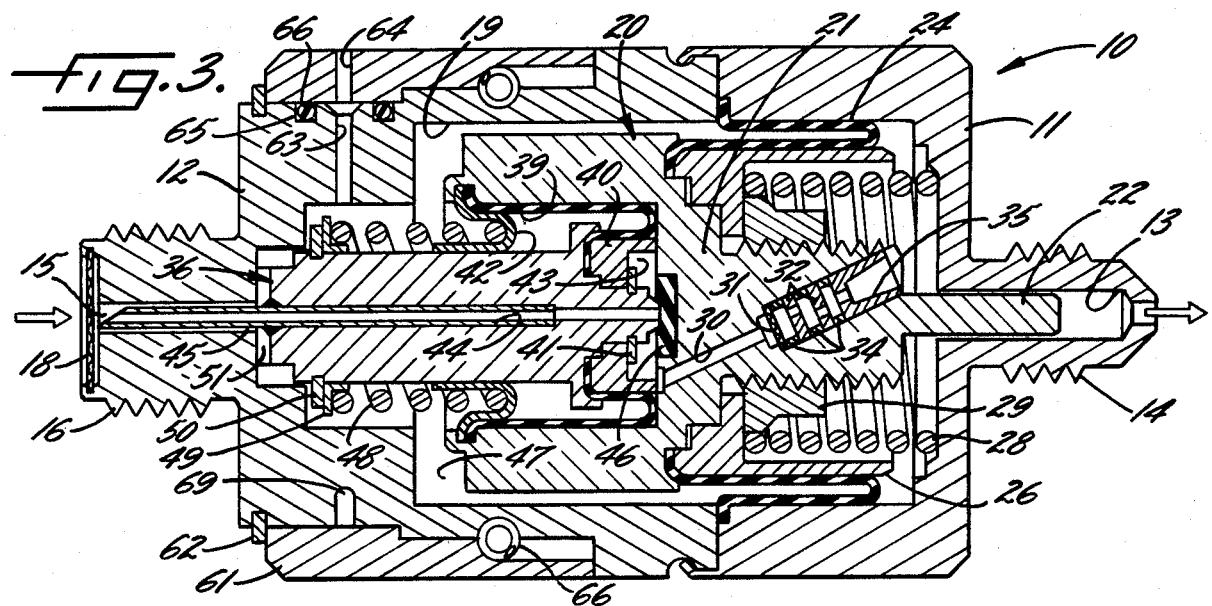

AUTOMATIC RESERVOIR BLEED VALVE

This invention relates to bleed valves for use in hydraulic and pneumatic systems and more particularly to an automatic bleed valve for removing the either free air from a hydraulic fluid reservoir or conversely liquid from a pneumatic reservoir.

While as suggested above and explained below, the bleed valve of the present invention may be configured as a bleed valve for either hydraulic or pneumatic reservoirs, it will be described primarily in the context of an air bleed valve for a hydraulic reservoir. As is well known, the presence of air bubbles or free air in a hydraulic system can cause serious problems. Thus, it has been desirable to provide a means for removing the air from a hydraulic system and, to this end, bleed valves of various types have typically been placed on the reservoir and/or the fluid return line of the hydraulic system. One type of bleed valve is an osmotic pressure equalizer, for removing air which is dissolved in the hydraulic fluid; another is a manually operated valve for bleeding free air. The former type is typically relatively large and expensive, sometimes involving an ejector for generating a vacuum to suppress the equilibrium pressure at sea level. Manual valves for bleeding free air are typically smaller and less expensive, but proper utilization is subject to the operator's forgetfulness or neglect.

Since the presence of free air within a hydraulic system is generally a cause of greater concern than the presence of entrained air, it has become desirable to provide a valve which automatically bleeds the free air from a hydraulic system. Thus, it is the primary object of the instant invention to provide an air bleed valve which automatically differentiates between hydraulic fluid and air, and bleeds the air while keeping the hydraulic fluid pressurized within the system.

As most hydraulic systems must fit within a given space envelope, it is a further object to provide such an automatic bleed valve which is relatively small in size and is not position sensitive so as to be readily usable with existing systems. Other objects and advantages of the invention will become apparent upon reference to the drawings in which:

FIG. 1 is an approximate representation of pressure drops across the principal elements of an air bleed valve of the instant invention;

FIG. 2 is an approximate representation of pressure drops across the various principal elements of an alternative embodiment of an air bleed valve of the instant invention;

FIG. 3 is a vertical section of the automatic air bleed valve of the present invention in its inactive condition;

FIG. 4 is a vertical section of the air bleed valve of FIG. 3 in its condition to prevent the escape of pressurized hydraulic fluid from an activated hydraulic system when there is no free air within the system;

FIG. 5 is a vertical section of the air bleed valve of FIG. 3 in its condition in which it will bleed free air contained within an activated hydraulic system;

Figure 6:
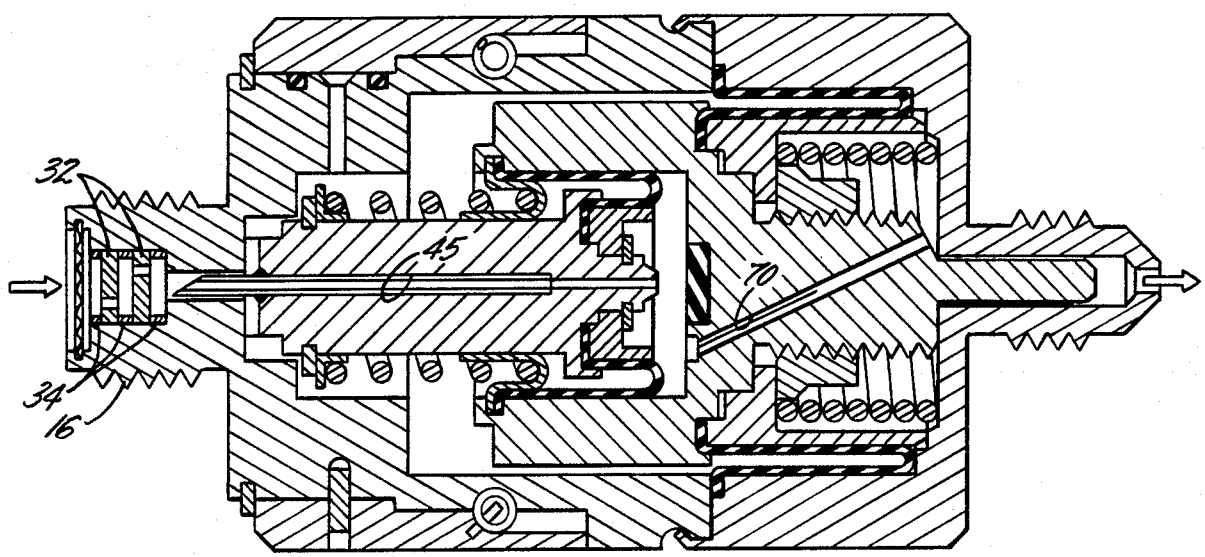
FIG. 6 is a vertical section of an alternative embodiment of an air bleed valve of the instant invention in its condition in which it will bleed free air contained within an activated hydraulic system.

While the invention will be described in connection with certain preferred embodiments, it will be understood that there is no intention to limit the invention to the construction shown. On the contrary, it is intended to cover the various alternative and equivalent constructions included within the spirit and scope of the appended claims.

In order to assure that the maximum amount of free air is bled from the reservoir, the present invention should be connected to the uppermost part of the hydraulic fluid reservoir, where the free air within the hydraulic system accumulates. The invention utilizes a capillary in series with an orifice, or plurality of orifices, to differentiate between liquid, e.g., hydraulic fluid, and gas, e.g., air, by differences in pressure drops which result from the viscosity differences.

The theory of operation is illustrated for different embodiments of the invention in FIGS. 1 and 2, with FIG. 1 being for a bleed valve in which the capillary is upstream of the orifice while FIG. 2 is for a bleed valve in which the orifice is upstream of the capillary. In both FIGS. 1 and 2 the pressure across the orifice drops from the reservoir pressure $P_R$ at the inlet of the bleed valve to the atmospheric or ambient pressure $P_A$ at the outlet of the valve. In FIG. 1, the solid line represents the pressure drop across the bleed valve for gas passing through the valve, while the dashed line represents the pressure drop for liquid. Both gas air and liquid enter the capillary of the bleed valve at $P_R$. However, due to differences in viscosity between gas and liquid, gas will have a comparatively slight pressure drop $\Delta P_{GC}$ across the capillary while liquid will have a large pressure drop $\Delta P_{LC}$. The remainder of the pressure drop across the valve to $P_A$ occurs across the orifice for both liquid and air. As discussed in detail below, the bleed valve of the instant invention is able to react to the differences in the pressure drops $\Delta P_{GC}$ and $\Delta P_{LC}$ across the capillary to allow the passage of gas through the valve while preventing the passage therethrough of liquid.

For FIG. 2, which illustrates pressure drops across the bleed valve in which the orifice in the valve is located upstream of the capillary, the solid line represents the pressure drop across the valve for liquid, while the dashed line represents the pressure drop for gas. Again, the valve is able to distinguish between liquid and gas as a liquid has a much greater pressure drop across the capillary $\Delta P_{LC}'$ than that for gas, $\Delta P_{GC}'$. As with the embodiment of the invention described in connection with FIG. 1, the valve embodiment which corresponds to FIG. 2 operates based upon the difference in the pressure drops $\Delta P_{LC}'$ and $\Delta P_{GC}'$.

For the embodiment whose operation is illustrated in FIG. 1, the capillary extends from the reservoir through a piston which is spring-biased away from a sealing member so as to create access from the capillary to the orifice and to atmosphere. When air, having relatively low viscosity, flows through the capillary, the differential pressure across the capillary and, accordingly, across the piston is low and insufficient to move the piston against the force of the spring. Thus, the capillary will not abut the sealing means and the air will pass out of the capillary, through the orifice, and out of the valve. When hydraulic fluid attempts to pass through the capillary, however, the differential pressure thereacross due to the fluid's relatively high viscosity is sufficient to seal the outlet of the capillary against the sealing member by shifting the piston against the force of the spring, thus preventing the hydraulic fluid from passing through the capillary and, hence, the bleed valve. The bleed valve may also utilize a second spring-biased piston which carries the sealing member for the outlet of the capillary. This piston has a large surface area relative to the piston through which the capillary extends and a stronger spring than that associated with the smaller piston. The larger piston is biased by its associated spring so that the sealing member abuts the outlet of the capillary at low reservoir pressures, thus preventing the valve from leaking fluid when the hydraulic system is inactive.

For the embodiment whose operation is illustrated in FIG. 2, the orifice may be placed in the inlet of the valve, upstream of the piston through which the capillary extends. In both cases, however, it is the difference in the pressure drop across the capillary for gas and liquid which actuates the piston through which the capillary passes.

Turning now to FIG. 3, there is shown an automatic bleed valve 10 of the instant invention for use in connection with pressurized fluid reservoirs. The valve is contained in a housing comprising members 11 and 12. The FIG. 3 embodiment operates in accordance with FIG. 1, discussed above. The housing member 11 includes an outlet 13 extending through a fitting 14, through which the housing communicates with the atmosphere.

The housing member 12 has an inlet 15 extending through a fitting 16 to connect the housing member with the hydraulic fluid reservoir (not shown) adjacent the area where free air collects in the reservoir. The fitting 16 includes a filter screen 18 covering the inlet 15 to prevent particulates contained within the hydraulic fluid from entering the bleed valve and possibly fouling the valve.

When joined together, the housing members 11 and 12 form a bore 19 on the interior thereof. Contained within the right-hand end of the bore 19 is what can be termed an "activating" piston, generally designated by 20. The piston 20 functions during the start-up of the hydraulic system to activate the bleed valve 10. The activating piston 20 shown has a diameter slightly smaller than that of the bore 19 and comprises a poppet 21 having a pilot spindle 22 extending into the outlet 13 and fitting 14 of the housing member 11. The spindle 22 is sized so that, while maintaining the alignment of the first piston 20 during its reciprocal movement within the bore 19, it still permits air to pass freely through the outlet 13 of the housing member 11. Opposite sides of the activating piston 20 are isolated from one another by means of a rolling diaphragm 24, which is secured to the walls of the bore 19 at the juncture of the housing members 11 and 12 by means of compression, and is secured to the piston 20 by means of an annular retainer 26 held in place by threaded ring 29.

The activating piston 20 is provided with biasing means in the form of a helical spring 28 interposed between the right-hand end of both the poppet 21 and bore 19. The spring 28 is located with respect to the poppet 21 within the annulus of the retainer 26 by means of the threaded ring 29.

Through the poppet 21 extends a conduit 30 which allows for communication between the opposite sides of the poppet. Within the conduit 30 is a filter screen 31 followed by, in the embodiment shown, a series of orifice plates 32 and spacers 34, all of which are secured within the conduit 30 by means of a retainer insert 35. The orifices may be offset from one another, causing the flow path through the conduit to be irregular, and increasing its effectiveness in creating the desired pressure drop as discussed above. It will be appreciated that a single plate with an orifice therein could be employed in place of the series of plates 32 and spacers 34 shown, though such a single orifice would have to be smaller in diameter to generate the same pressure drop and might, accordingly, be more subject to plugging than the series of larger orifices.

Disposed within the lefthand end of the bore 19 is what can be termed a "differentiating" piston, generally designated by 36, shown having a relatively small surface area when compared to the surface area of the bore 19. The piston 36 functions to differentiate between air and hydraulic fluid after the piston 20 has activated the bleed valve. The differentiating piston 36 is movable with respect to both the housing members 11 and 12 and the activating piston 20. The differentiating piston 36 fits within an annular recess in the lefthand end of the activating piston 20, with opposite sides of the piston 36 being isolated from one another by means of a rolling diaphragm 39 interposed between the piston 36 and the wall of the annular recess of the piston 20. The rolling diaphragm 39 is secured to the differentiating piston 36 by means of a retainer 40 and ring 41, and is secured to the activating piston 20 by means of the retainer insert and spring seat 42.

The differentiating piston 36 has a conduit 44 extending therethrough to provide communication between the reservoir and an interior chamber 43 formed within the annular recess of the activating piston 20 by the rolling diaphragm 39. Within the interior chamber 43 is a sealing member 46 which is capable of engagement with the righthand end of the conduit 44 to prevent communication between the conduit and the chamber. In the illustrated embodiment the sealing member is a resilient disk 46. However, other types of sealing devices may also be utilized, e.g., a captive but floating ball seatable over the interior end of the conduit 44 when the piston 36 is urged toward piston 20. A capillary tube 45 is inserted within the conduit 44, with the lefthand or inlet end of the capillary tube 45 extending into the inlet 15 of the housing member 12, so as to act as a pilot spindle to maintain axial alignment of the piston 36 as it reciprocates within the bore 19. It should be noted, however, that the bore of inlet 15 must be sufficiently larger than the outside diameter of the capillary tube 45 to assure pressurization of the chamber 47 to full reservoir pressure. The end of the differentiating piston 36 adjacent to the inlet 15 is also relieved at 51 to ensure the same end. Alternatively, it will be appreciated that flow resistance equivalent of the linear capillary 45 might be created by other means, e.g., with internal screw threads into which a screw with truncated external threads is inserted, thereby forming a helical capillary.

Interposed between the activating and differentiating pistons, 20 and 36, respectively, is a helical spring 48. The spring 48 is located with respect to the piston 20 by means of the retainer insert 42, and is located with respect to the piston 36 by means of a cap 49 and retaining ring 50.

In operation, the pistons 20 and 36 move between their first positions shown in FIG. 3 and their positions as shown in FIG. 4. When the hydraulic system within which the automatic bleed valve 10 is utilized is in its inactive condition (i.e., before the hydraulic pump is activated), there will be no pressure differential across the bleed valve 10 between its inlet 15 and outlet 13.

Under such a state, the spring 28 will overcome the spring 48 and urge the pistons 20 and 36 into their positions as shown in FIG. 3, in which the differentiating piston 36 is bottomed against the lefthand end of the bore 19 and the abuttable sealing disk 46 on the wall of the annular recess of the activating piston 20 engages the righthand end of the conduit 44, thus preventing any flow from the reservoir through the conduit 44 and, hence, the bleed valve 10.

Upon activation of the hydraulic system, a differential pressure will be created across the bleed valve 10. Initially, regardless of whether free air is present, the chamber 47 will be pressurized to act on the relatively large area of piston 20 to bottom it against the righthand end of the bore against the force of the spring 28, as seen in FIGS. 4 and 5. The chamber 43 between the activating and differentiating pistons 20, 36 will tend to expand under the action of spring 48. If there is no free air within the hydraulic reservoir to which the bleed valve 10 is attached, hydraulic fluid will be present at the inlet 15 of the housing member 12. According to one aspect of the invention, when the hydraulic fluid attempts to flow through the conduit 44 and capillary tube 45, a large pressure drop $\Delta P_{LC}$ is created thereacross, due to the relatively high viscosity of the hydraulic fluid. It will be appreciated that, in order to operate in this manner, the area of the differentiating piston 36 and the strength of the spring 48 should be chosen so that this relatively high pressure differential acting on the piston 36 maintains the righthand end of the conduit 44 against the resilient sealing disk 46, as shown in FIG. 4, effectively sealing the outlet of the capillary 45 and, thus, preventing the passage of hydraulic fluid through the bleed valve.

By contrast, if the hydraulic fluid reservoir contains free air, once the spring 48 tends to shift the end of the conduit 44 away from the sealing disk 46 upon the initial activation of the bleed valve 10, as explained above, the passage of low viscosity air through the capillary tube 45 and the orifice plates 32 will result in a relatively small pressure differential $\Delta P_{GC}$ being established across the conduit 44. Under these circumstances, by choosing the area of the piston 36 and the strength of the spring 48 so that the relatively low pressure differential across the piston 36 is insufficient to overcome the spring 48, the valve will remain open, bleeding the air from the reservoir. Specifically, the piston 36 assumes the position shown in FIG. 5, with the righthand end of the conduit 44 moved out of engagement with the abuttable sealing disk 46, thus permitting air to enter into the intermediate chamber 43. The air can then pass through the conduit 30 and orifice plates 32 and out of the bleed valve 10 through the outlet 13. Once all the free air is bled from the hydraulic fluid reservoir, hydraulic fluid will enter the inlet 15 of the bleed valve and, as explained above, create a sufficient differential pressure $\Delta P_{LC}$ across the conduit 44 of the piston 36 to move the piston 36 into the position shown in FIG. 4.

As previously noted, the conduit 30 may contain either a single orifice or a series of orifice plates 32 and spacers 34 to create a restricted, irregular flow path. With the flow path open from the inlet 15 through the outlet 13, free air entering the capillary tube 45 will have a substantially laminar flow, which results in there being a very low pressure differential across the conduit 44, the remainder of the pressure drop between the reservoir and atmosphere being established across the orifice plates 32. By using a series of orifice plates 32 and spacers 34, the cross sectional area of the orifice in each plate may be larger than if a single orifice plate were used and, consequently, the larger, multiple orifices are less likely to become blocked by particulates which may be contained in the fluid.

Summarizing, from the above it will be appreciated that, when air bleeds through the valve 10, the pressure drop $\Delta P_{GC}$ across the capillary tube 45 should be relatively insignificant in comparison to the total pressure drop across the valve 10 (the pressure drop across the valve being the difference between the reservoir pressure and ambient pressure). Thus, for air, the significant pressure drop should occur across the flow-restricting orifice. When pressurized hydraulic fluid attempts to pass through the valve 10, the pressure drop $\Delta P_{LC}$ across the capillary 45 should be significantly greater in comparison to the corresponding pressure drops for air, thus enabling the bleed valve to distinguish between air and hydraulic fluid.

Consequently, in order for the piston 36 to differentiate between hydraulic fluid and air, the inside diameter of the capillary 45 should be sized relative to the orifices to meet two conditions. First, when pressurized hydraulic fluid fills the chamber 47, the pressure differential $\Delta P_{LC}$ across the capillary 45 (and hence the piston 36) should be such that the force acting on the piston 36 due to the pressure differential is greater than the force of the spring 48. Under such circumstances, the piston 36 will move so that the outlet of the capillary 45 abuts the sealing disk 46, thus preventing the passage of hydraulic fluid out of the conduit 44, as shown in FIG. 4. Second, when pressurized free air fills the chamber 47, the pressure differential across the capillary tube $\Delta P_{GC}$ should be such that the force acting on the piston 36 due to the pressure differential is less than the force of the spring 48. Under these circumstances, the spring 48 will act to move the outlet of the capillary 45 out of abutment with the sealing disk 46, as shown in FIG. 5, to allow the passage of air through the orifice and out of the bleed valve. In one embodiment, the combination of a capillary tube 45 1.320 inches long with a 0.0175 inch inside diameter with three orifice plates 32 having 0.016 inch orifices therein yielded satisfactory operation.

Another design condition for the embodiment shown is that the spring 28 associated with activating piston 20 be stronger than the spring 48 disposed between the activating piston 20 and the differentiating piston 36 so that the pistons assume their positions shown in FIG. 3, with the sealing disk 46 abuttably sealing the outlet of the conduit 44, when the hydraulic system is deactivated, so as to prevent any fluid from leaking through the valve. Also, the surface area of the activating piston 20 that is subjected to pressurized fluid contained in chamber 47 should be greater than that of the same surface of the differentiating piston 36 so that the activating piston 20 will move against the force of spring 28 to its position of FIGS. 4 and 5, regardless of whether the chamber 47 is filled with pressurized air or hydraulic fluid, before the fluid pressure acting on the differentiating piston 36 is sufficient to move it against the force of spring 48 toward the activating piston 20. Thus, upon starting up the hydraulic system to which the bleed valve of the instant invention is attached, the activating piston 20 moves from its position as shown in FIG. 3 to that of FIG. 5, while the differentiating piston 36 remains stationary.

As an option, the housing member 12 may be constructed so as to allow for manual activation of the bleed valve. In the embodiment shown in FIGS. 3-5, the housing member 12 carries a sleeve 61, which is rotatable with respect to the housing member and secured to it by a retaining ring 62. The housing member 12 has a bore 63 therethrough, which, upon rotation of the sleeve 61, can be aligned with a similar bore 64 in the sleeve 61, as shown in FIG. 3. Thus, direct communication between the chamber 47 of the bleed valve 10 and the atmosphere is provided to bleed off free air. The housing 12 is shown with a recessed seat 65, which holds a resilient gasket 66 to provide a seal between the bores 63, 64 when they are out of alignment. The housing 12 and sleeve 61 are urged to relative positions in which the bores 60 and 61 are not aligned (FIGS. 4 and 5) by means of a compression spring 66 and a pair of pins 67 (only one of which is shown), one being mounted to the housing 12 and the other to the sleeve 61. This arrangement provides a spring return to restore the sleeve 61 to its original position relative to the housing 12 (FIGS. 4 and 5) after it has been manually twisted to compress the spring 66 and align the bores 63, 64 (FIG. 3). A pin 68 secured in the exterior sleeve 61 engages a slot 69 in the housing 12 to define the range of travel of the sleeve 61. The slot 69 is sized and oriented such that, with the sleeve 61 in its unactuated condition (FIGS. 4 and 5), the pin 68 abuts one of the ends of the slot 69, and the bores 62 and 63 are out of alignment. When the sleeve 61 is twisted, the pin 68 abuts the other end of the slot 69 at the point at which the bores 62 and 63 are aligned. Such an arrangement facilitates quick, positive operation.

In the alternative embodiment of FIG. 6, the operation of which is in accordance with FIG..2, the orifice plates 32 and spacers 34 are disposed within the fitting 16 of the inlet, with the activating piston having a relatively unrestricted flow conduit 70 extending therethrough in place of the orifice plates. In other respects the embodiment of FIG. 6 is similar to that of FIGS. 3, 4 and 5.

The valve in FIG. 6 is shown in the condition corresponding to FIG. 5 of the previously-described embodiment, i.e., in a condition in which free air is passing through the valve. It will be appreciated that the FIG. 6 embodiment, as with the FIGS. 3-5 embodiment, selectively responds to the passage of hydraulic fluid and air on the basis of the disparate pressure drops $\Delta P_{LC}'$ and $\Delta P_{GC}'$ across the capillary 45.

In the embodiment shown in FIG. 6, when the hydraulic system is inactive, the activating piston having flow conduit 70 is positioned against the differentiating piston having capillary 45 to seal off the flow of hydraulic fluid through the valve so as to prevent leakage. Upon initial pressurization of the reservoir, there is little flow through the orifices 32 and spacers 34 and the activating piston will be bottomed against the righthand end of the bore as shown, thus opening the valve. As the pressure in the reservoir increases, the flow of fluid will also increase. When air is the fluid passing through the orifices, the relatively large pressure drop thereacross will reduce the flow of air therethrough so that the pressure differential across the capillary will be insufficient to overcome the spring force acting on the differentiating piston. Under these circumstances, the valve will remain open. When the air is depleted and hydraulic fluid enters the capillary, the higher viscosity of the hydraulic fluid will cause the capillary to become the dominant factor controlling the flow, and the flow will be reduced. This reduced flow decreases the pressure drop across the upstream orifices, and hydraulic fluid entering the bleed valve will create a pressure drop across the differentiating piston sufficient to close the valve.

While the invention described has great utility as an air bleed valve in a hydraulic circuit, by reversal of the positions of the capillary 45 and the orifices 32, with the orifices being in the differentiating piston 36 and the capillary in the activating piston 21, the valve could be utilized to automatically drain liquid from, e.g., a pressurized pneumatic tank. Such an embodiment is shown in FIG. 7.

Figure 7:
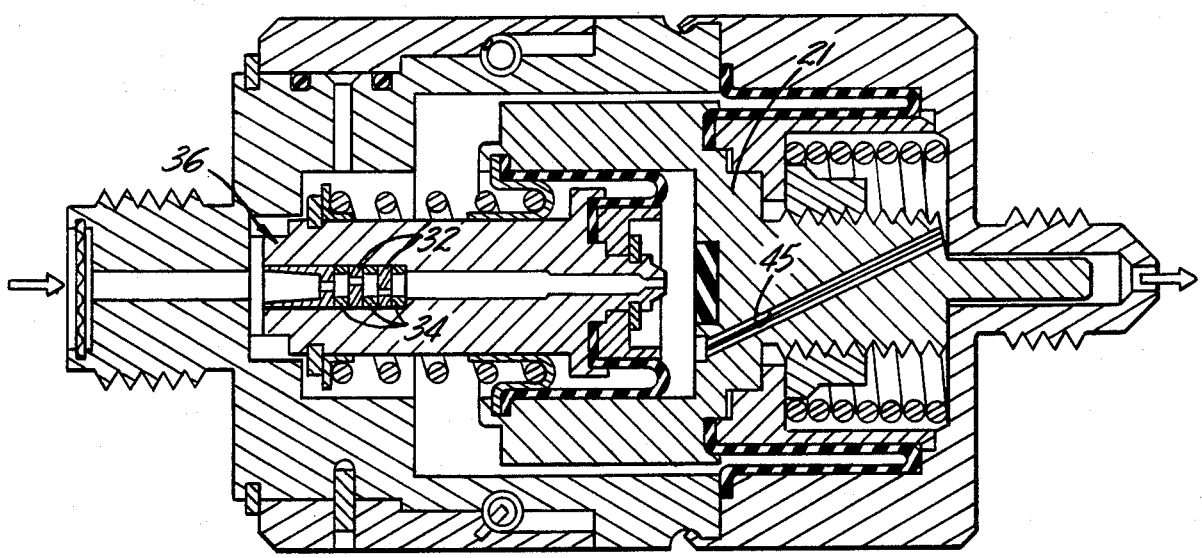
FIG. 7 is a vertical section of a liquid bleed valve of the instant invention in its condition in which it will bleed liquid contained within an activated pneumatic system.

When a viscous liquid passes through the valve shown in FIG. 7, the flow is limited and controlled by the capillary 45. This limited flow develops a correspondingly small differential pressure across the orifices 32 and spacers 34 which is insufficient to overcome the spring force biasing the differentiating piston. Thus the valve remains open and liquid will bleed from the reservoir. When the liquid is depleted, and when the gas in the reservoir begins to flow through the valve, the orifices then become the dominate factor controlling the volumetric flow since the capillary is not as effective in restricting the flow of the low viscosity gas. Consequently, the gas will undergo a pressure drop across the orifices sufficient to overcome the biasing force and close the valve.

It will be appreciated that, in such an application, the valve should be positioned at the lowest point of the tank, where the liquid will collect.

What is claimed is:

1. An automatic bleed valve for pressurized fluid reservoirs comprising, in combination,
   (a) a housing having a flow path extending therethrough,
   (b) first and second flow restricting means interposed in said flow path, one of said flow restricting means including a capillary,
   (c) pressure-sensitive sealing means responsive to the pressure drop across one of said flow restricting means, said pressure-sensitive sealing means comprising a piston through which a portion of said flow path runs, said piston including one of said flow restricting means,
   (d) biasing means engaging said piston, and
   (e) an abuttable sealing member positioned to engage one end of the flow path through said piston upon movement of said piston against the force of said biasing means when the pressure drop across said piston exerts a force on said piston exceeding the force of said biasing means such that the reservoir is bled automatically until the pressure drop exceeds a predetermined minimum, at which point said pressure-sensitive sealing means blocks said flow path to prevent the flow of fluid therethrough.

2. The bleed valve of claim 1 wherein said first flow restricting means comprises said capillary, said capillary being carried by said piston, and said pressure-sensitive sealing means is responsive to the pressure drop across said capillary whereby said valve automatically bleeds air from a liquid reservoir.

3. The automatic reservoir air bleed valve of claim 2 wherein said second flow restricting means comprises at least one orifice.

4. The automatic reservoir air bleed valve of claim 3 wherein said second flow restricting means is interposed in said flow path downstream of said first flow restricting means.

5. The automatic reservoir air bleed valve of claim 3 wherein said second flow restricting means is interposed in said flow path upstream of said first flow restricting means.

6. The automatic reservoir air bleed valve of claim 2 further comprising a manually actuated override.

7. The bleed valve of claim 1 wherein said first flow restricting means comprises said capillary, said piston includes said second flow restricting means, and said pressure-sensitive sealing means is responsive to the pressure drop across said second flow restricting means so that said valve automatically bleeds liquid from a pneumatic reservoir.

8. The automatic reservoir liquid bleed valve of claim 7 further comprising a manually actuated override.

9. An automatic bleed valve for pressurized fluid reservoirs comprising, in combination:
(a) a housing with a bore therein, the bore having an inlet which communicates with a reservoir at pressure $P_1$ from which the fluid is to be bled and an outlet which communicates with a space at pressure $P_2$ into which the fluid is to be bled;
(b) abuttable sealing means disposed within the bore of the housing;
(c) a piston disposed within the bore, the piston having a capillary within an inlet and an outlet disposed therethrough connecting the opposite ends of the piston, the piston further being mounted within the housing for reciprocal movement therein between a first position relative to the abuttable sealing means in which the outlet of the capillary is held against the abuttable sealing means and is sealed off and a second position relative to the abuttable sealing means in which said outlet of the capillary is spaced from the abuttable sealing means, the opposite ends of the piston being isolated from one another via sealing means to permit a differential fluid pressure to be established on the opposite ends of the piston, with one end of the piston and the inlet of the capillary tube being subjected to fluid from the reservoir at pressure $P_1$;
(d) flow-restricting means disposed between the outlet end of the capillary and the outlet of the housing establishing a flow path from the reservoir through the capillary and through the flow-restricting means to the housing outlet, when the piston is in its second position; and
(e) biasing means tending to move the piston into its second position, the outlet of the capillary being subjected to an intermediate pressure $P_3$, the intermediate pressure $P_3$ being the reservoir pressure $P_1$ less the pressure drop $\Delta P$ across the capillary, the biasing means holding the piston in its second position relative to the abuttable sealing means until the pressure drop $\Delta P$ across the capillary exceeds a predetermined value and overcomes the force the biasing means exerts on the piston, whereupon the piston moves into its first position relative to the abuttable sealing means, the value being chosen such that the force of the biasing means is exceeded only when liquid from the reservoir enters the capillary tube.

10. The bleed valve of claim 4 in which the flow restricting means comprises a plurality of orifice plates and spacers.

11. An automatic bleed valve for pressurized fluid reservoirs which selectively bleeds gas while preventing the flow of liquid therethrough comprising, in combination:
(a) a housing with a bore therein, the bore having an inlet which communicates with the reservoir from which gas is to be bled and an outlet which communicates with the space into which the gas is to be bled;
(b) a first piston disposed within the bore, the first piston being mounted for reciprocal movement within the bore between first and second positions relative to the housing, the opposite ends of the piston being isolated from one another via sealing means to permit a differential fluid pressure to be established on the opposite ends of the first piston, one end of the first piston being subjected to the reservoir fluid pressure $P_1$ and the other end of the piston being subjected to the pressure $P_2$ of the space;
(c) first biasing means tending to retain the first piston in its first position, the first piston shifting from its first position to its second position when the pressure $P_1$ exceeds the pressure $P_2$ by a predetermined amount;
(d) a chamber having abuttable sealing means disposed in a wall thereof;
(e) conduit means having a flow-restricting means comprising at least one orifice therein connecting the chamber to the outlet;
(f) a second piston disposed within the bore, the opposite ends of the second piston being isolated from one another via sealing means to permit a differential fluid pressure to be established on the opposite ends of the second piston, the second piston having a capillary tube disposed therethrough connecting the opposite ends of the second piston, one end of the second piston and the inlet end of the capillary tube being subjected to fluid from the reservoir at pressure $P_1$, with the other end of the second piston forming a further wall of the intermediate chamber, the second piston being movable relative to the abuttable sealing means between a first position relative to the abuttable sealing means between a first position relative to the abuttable sealing means in which the outlet end of the capillary tube is held against the abuttable sealing means and is sealed off and a second position relative to the abuttable sealing means in which said outlet end of the capillary tube is spaced from the abuttable sealing means, thereby establishing a flow path from the reservoir through the capillary tube, through the chamber and through the conduit means and associated flow-restricting means to the outlet, the first piston holding the second piston in its first position relative to the abuttable sealing means so long as the first piston is in its first position; and
(g) second biasing means tending to more the second piston into its second position relative to the abuttable sealing means when the first piston is in its second position, such that the chamber is pressurized to an intermediate pressure $P_3$, the intermediate pressure $P_3$ being the reservoir fluid pressure $P_1$ less the pressure drop $\Delta P$ across the capillary tube, the second biasing means holding the second piston in its second position relative to the abuttable sealing means until the pressure drop $\Delta P$ exceeds a predetermined value, the value being chosen such that it is exceeded only when liquid from the reservoir enters the capillary tube whereupon the second piston moves into its first position relative to the abuttable sealing means.

12. The bleed valve of claim 11 in which the flow restricting means comprises a plurality of orifice plates and spacers.

13. The bleed valve of claim 11 in which the first piston has a recess into which the second piston slidably fits, the recess including the abuttable sealing means, the second biasing means being disposed between the first and second pistons, and the intermediate chamber being formed by the recess of the first piston and the other end of the second piston.

* * * * *